US012316701B2

(12) United States Patent
Liu et al.

(10) Patent No.: US 12,316,701 B2
(45) Date of Patent: May 27, 2025

(54) SERVER SELECTION FOR REDUCING LATENCY WITH A SERVICE INSTANCE

(71) Applicant: AT&T Intellectual Property I, L.P., Atlanta, GA (US)

(72) Inventors: Zhengye Liu, Pleasanton, CA (US); Yali Liu, Dublin, CA (US); Jin Wang, Fremont, CA (US); Raghvendra Savoor, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/954,274

(22) Filed: Sep. 27, 2022

(65) Prior Publication Data

US 2024/0106887 A1    Mar. 28, 2024

(51) Int. Cl.
*H04L 67/101* (2022.01)
*H04L 45/121* (2022.01)

(52) U.S. Cl.
CPC .......... *H04L 67/101* (2013.01); *H04L 45/121* (2013.01)

(58) Field of Classification Search
CPC ............................ H04L 67/101; H04L 45/121
See application file for complete search history.

(56) References Cited

U.S. PATENT DOCUMENTS

| 11,395,308 | B2 * | 7/2022 | Zhang ................. H04L 12/1403 |
| 2022/0255839 | A1 * | 8/2022 | Dhanabalan ............ H04L 63/20 |

FOREIGN PATENT DOCUMENTS

WO    WO-2020091737 A1 *  5/2020  .......... H04L 61/1511

OTHER PUBLICATIONS

Liu et al. "Server Selection Corresponding to a Multi-Participant Environment" U.S. Appl. No. 17/951,909, filed Sep. 23, 2022, 55 pages.
Liu et al. "Estimation of Network Latency based on Aggregated Performance Data" U.S. Appl. No. 17/957,326, filed Sep. 30, 2022, 61 pages.
Liu et al. "Perpetuation of a Distributed Multi-Participant Environment" U.S. Appl. No. 17/960,771, filed Oct. 5, 2022, 52 pages.

* cited by examiner

*Primary Examiner* — Ryan J Jakovac
(74) *Attorney, Agent, or Firm* — Guntin & Gust, PLC; Atanu Das

(57) ABSTRACT

Server selection for improving latency with an instance of a service is disclosed. Generally, lower core latency is preferable. Core latencies can be related to a physical distance between endpoints connected via a communication pathway, such as a first server and second server connected via network equipment. A geographic distance between endpoints can be different from a topological distance of a communication pathway between endpoints. Endpoints, e.g., servers, can be ranked based on topological distance. The ranking can be communicated to service provider equipment to enable selection of a server based on a corresponding ranking of the server. Selection of an endpoint based on topological distance can enable improved latency in comparison to selecting an endpoint based on geographical distance. Improved latency can result in an improved quality of experience for a user of a service supported by an endpoint selected based on topological distance.

20 Claims, 10 Drawing Sheets

SERVER SELECTION FOR REDUCING LATENCY WITH A SERVICE INSTANCE

TECHNICAL FIELD

The disclosed subject matter relates to server selection for instance(s) of a multi-participant environment.

BACKGROUND

Conventional server selection techniques can attempt to reduce latency by electing use of a server that can be geographically closer to a user equipment (UE), user device, mobile device, etc. This election can be based on reducing a distance between the UE and the server to correspondingly reduce the time requested, desired, or needed to propagate a signal across this distance where the propagation rate can generally be proportional to the distance, e.g., distance multiplied by the speed of light in the path medium approximates the signal propagation time across the distance. However, this does not always lead to the best choices for a given application and/or network topology.

DETAILED DESCRIPTION

Figure 1:
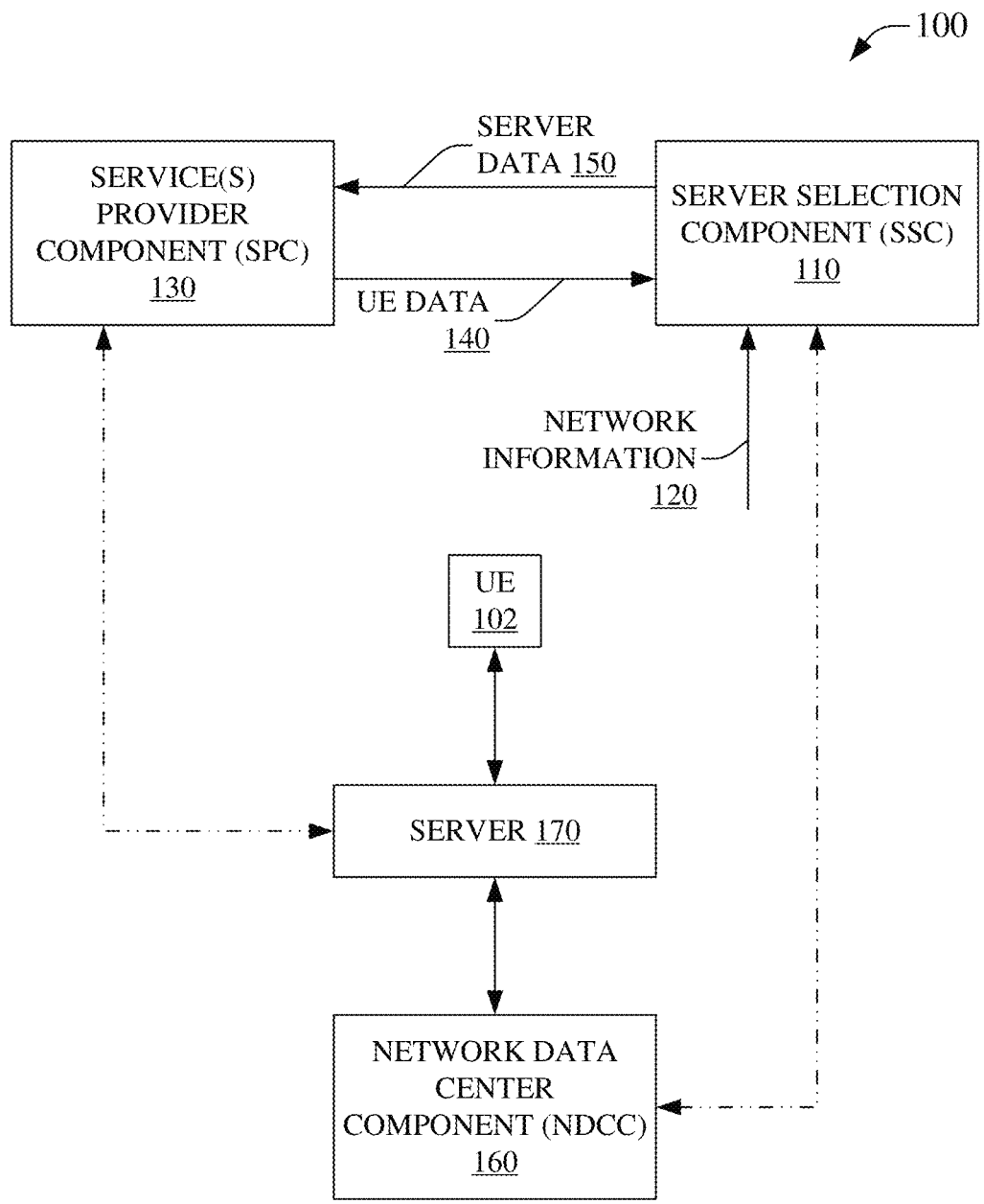
FIG. 1 is an illustration of an example system that can facilitate selecting a server that can improve latency with a service instance, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As noted above, while conventional solutions typically select servers based on distance to requesting device, a network topology can impact latency when multiple servers/user equipment are implicated. In this regard, a layout of a network can result in propagation of signals across path distances that can be different than a geographical distance between endpoints. As an example, a user equipment (UE), user device, mobile device, etc. can be located in Hawaii, a first server can be located in Hawaii, and a second server can be located in Seattle. In this example, both the first and second server can be connected to other network components via a network datacenter also located in Seattle. If the first server of this example is selected, then signals corresponding to communication with the UE can pass from the Hawaii server to another endpoint via the Seattle datacenter, then back to the Hawaii server, again via the Seattle datacenter. In contrast, if the Seattle server is selected, which can be much closer to the Seattle datacenter, then communication between the server and the other example endpoint via the Seattle datacenter can experience a shorter path length than for the Hawaii server. This can reduce latency, which can improve Quality of Experienced (QoE) metrics, even though the selecting the Seattle server, rather than the Hawaii server, can be viewed as selecting a server that is geographically much further from the UE. Accordingly, it can be desirable to implement a server selection technology that can consider QoE improvement, e.g., latency improvement, etc., rather than just choosing server that is just geographically close to a UE.

In more detail, conventional server selection techniques can select a geographically close server, to a UE, in an attempt to reduce latency associated with a service accessed via the UE. Generally, reducing a distance between the UE and the server is presumed to correspondingly reduce the time taken to propagate a signal across this distance. However, as noted, a network topology can impact experienced latency. In this regard, a layout of a network can result in propagation of signals across path distances that can be different than a geographical distance between endpoints, e.g., a network topology can result in a path that is more convoluted than a direct geographical distance between endpoints. As another example, a first server can be located in Miami and a second server can be located in Atlanta, such that the geographical distance between the servers is about 1000 km. However, in this example, a topology of an example network can connect the first server and second server via a network hub located in Houston, such that the path length is about 2700 km, where Miami to Houston is about 1600 km and Houston to Atlanta is about 1100 km. Accordingly, relying on the geographical distance between Miami and Atlanta for the first and second servers to reduce latency can be less meaningful than understanding the network distance being much longer due to passing through the network hub in Houston.

Generally, end-to-end latency values can be understood to typically contain multiple latency components, typically dominated by latency induced by an access network, e.g., WIFI, 5G, etc., and core network latency, which can be largely determined by a distance between an instance of a service executing on a server and a core network component, e.g., end-to-end latency can be dominated by a sum of an access network latency and a core network latency. In this regard, latency induced by an access network is typically dictated by access network technology and access network congestion. Access network latency can be highly variable, for example, a UE employing a 5G wireless access network can experience a change in latency just by moving the UE from a desk in an office to an elevator car, and a further change moving from the elevator car to a parking garage, as a user carries the UE out of the office at the end of the day. Accordingly, the presently disclosed subject matter can be directed to reducing core network latency via selection of a server to reduce topological pathlength, wherein core network latency can be considered to be limited by the speed of light in an optical fiber and a topological distance between two ends of a communication pathway. Accordingly, rather than simply selecting a server to reduce geographical distance between endpoints, server selection can consider topological pathlength between endpoints.

An embodiment of the disclosed subject matter discloses server selection based on topological distance between endpoints. Additionally, server selection can be constrained to selection from a group of preferred servers. In an example, a group of preferred servers can comprise two servers correspondingly already hosting an instance of a service. In this example, selection of one of the two servers running a service instance can avoid selecting a server that is not already hosting an instance of the service, which can correspondingly avoid requesting or needing to instantiate another instance of the service. However, in some embodiments, selection of a non-preferred server providing sufficient core latency improvement can be determined to be acceptable even where this can result in instantiation of an additional instance of a server on the selected non-preferred server. In some embodiments, pricing information can be provided, such as for instantiation of an instance of a service at a server, to enable selection of a server based on one or more criterion, for example, a criteria can comprise a pricing criterion and a core latency criterion, etc., or combinations thereof.

Communication of data related to a service offered by a service provider can generally be asymmetric, e.g., having more data communicated between a UE and a server than between servers to provide the service, which can be termed UE heavy asymmetry, having more data between servers than between the UE and the server to provide the service, which can be termed server heavy asymmetry, etc. As an example of UE heavy asymmetry, an application can execute on just one server, such that all data is just between the UE and that one server. In this example, selecting a server topologically closer to the UE can reduce core latency in comparison to a server topologically farther from the UE because the data exchange between the UE and the server can dominate the core latency in this example. As an example of server heavy asymmetry, a service on a server can perform data exchange, access, etc., with other servers and perform operations based on this data exchange that result in subsequent data exchange with a UE, e.g., the server can perform relatively more data access with other servers than with the UE to support the UE use of the service. In this example, selection of a server that is topologically closer to other servers, even where topologically farther from the UE, can improve latency over selecting a server topologically closer to the UE and topologically farther from the other servers, because the relatively larger data exchange between the servers, as compared to between the UE and the server, can have more influence on the total core latency in this example. In embodiments, information about a UE, hereinafter termed UE data, e.g., UE data 140, etc., can be used to determine a type of asymmetry, if any, which UE data can be employed in server selection. UE data can comprise other UE related information, for example, geographic location of a UE, latency tolerance value(s), subscriber information related to a service, subscriber information related to wired/wireless network access, etc. This UE data can also be employed in determining selection of a server.

Embodiments of the disclosed subject matter can comprise a server selection component (SSC). In some embodiments, an SSC can be a component communicatively connected to a core network, comprised in a core network, etc. In some embodiments, an SSC can be comprised in a core network component (CNC). In embodiments, there can be more than one instance of an SSC that can act independently, e.g., SSC instances generally not sharing information cooperatively, etc., cooperatively e.g., SSC instances sharing information cooperatively, etc., hierarchically, e.g., a first tier of SSC instances acting subordinate to second tier SSC instance(s), etc., and/or as a distributed SSC, e.g., several SSC instances interacting as an SSC, etc.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate selecting a server that can improve, e.g., reduce, latency relative to a service instance, in accordance with aspects of the subject disclosure. System 100 can comprise server selection component (SSC) 110 that can receive UE data 140, corresponding to UE 102, which can comprise UE location information, identification of a service to be used, etc. UE data 140 can be received from service(s) provider component (SPC) 130. UE data 140 can be determined, for UE 102, by SPC 130 via communication with, monitoring of, etc., server 170. As an example, UE 102 can be connected to server 170 and can indicate, via server 170, an intent to access a service instance corresponding to SPC 130, which intent can be communicated to SPC 130 via server 170, via server 170 and network data center component (NDCC) 160, via NDCC 160, or via nearly any other network pathway that supports UE 102 indicating to SPC 130 the intent of UE 102 to access the example service instance. In this regard, UE 102 does not need to be connected directly to SPC 130 for SPC 130 to receive information about UE 102 that can be employed to generate UE data 140 that can be communicated to SSC 110 by SPC 130.

SSC 110 can receive network information 120 that can comprise topological information about a network to facilitate selection of a server based on topological distance(s). In embodiments, network information 120 can be received from NDCC 160, or other network components, systems, devices, equipment, etc. Network information 120 can, in some embodiments, comprise other supplemental information, such as pricing, network/server status(es) that can include congestion information, maintenance information, historical performance information, etc., or other types of supplemental network information. This supplemental information can be employed to in determining selectable servers, to refine selection, determining ranking of severs, etc. In embodiments, supplemental information can be employed in determining server data 250.

SSC 110 can determine server data 150, which can indicate a server, a ranking of server(s), an order of server selection, etc., that can be accessed by SPC 130. Server data 150 can be determined by SSC 110, and can be based on UE data 140, network information 120, etc. As an example, SPC 130 can monitor server 170, via NDCC 160 that can be connected to server 170, and can determine that UE 102 intends to access a service. SPC 130 can generate UE data 140 based on the example monitoring of server 170 by SPC 130. SSC 110, for example, can be informed, via UE data 140, of an identifier corresponding to UE 102 enabling determining a location of UE 102 via a network provider home location register (HLR) component, and the identification of the service that UE 102 intends to access. SSC 110, based on network information 120 indicating server 170 hosts an instance of the intended service and that UE 102 is topologically closer to server 170 than other servers, can indicate to SPC 130, via server data 150, that server 170 is a highest ranked server among available servers to support UE 102 access to the service instance. SPC 130, based on server data 150, can then facilitate UE 102 accessing the service instance at server 170, for example, steering a requested access to the service instance received from UE 102 to the service instance hosted at server 170. In a variation of this example, SPC 130, again based on server data 150, can then communicate to UE 102 to instruct UE 102 to accessing the service instance at server 170. It is noted that selection of a topologically closer server is disclosed, rather than selecting a geographically closer server. It is further noted that topologically closer and geographically closer are not mutually exclusive conditions and, as such, a topologically closer server can be selected where the selected server is also geographically closer than other servers, is not geographically closer than other servers, is geographically equidistant as other servers, etc.

In embodiments, server data 150 can indicate a server that is topologically closer to another endpoint, e.g., UE 102, another server, a network datacenter, etc., to SPC 130. In some embodiments, server data 150 can indicate a server that can already be hosting an instance of a service. In some embodiments, server data 150 can indicate a server that may not already be hosting an instance of a service. In some embodiments, server data 150 can indicate a first server that already hosts a first instance of a service and a second server that does not already host a second instance of the service. In this regard, server ranking can indicate the first or second server as having a higher rank, however SPC 130 can select a lower ranked server, for example where a higher ranked server does not already host an instance of the service. In these embodiments, SPC 130 can enable service provider control enabling selection of a more latent server to avoid the cost of causing a new instance of the examples service to be hosted at a less latent server (that is, exhibiting less latency compared to another server). It will be appreciated by those of skill in the relevant arts that the service provider can select, e.g., via SPC 130 operations, to implement a new instance of a service at a less latent server for myriad business reasons, e.g., the cost of the new instance is acceptable to reduce the latency by selecting the less latent server rather than the more latent server already hosting an instance of the service.

Figure 2:
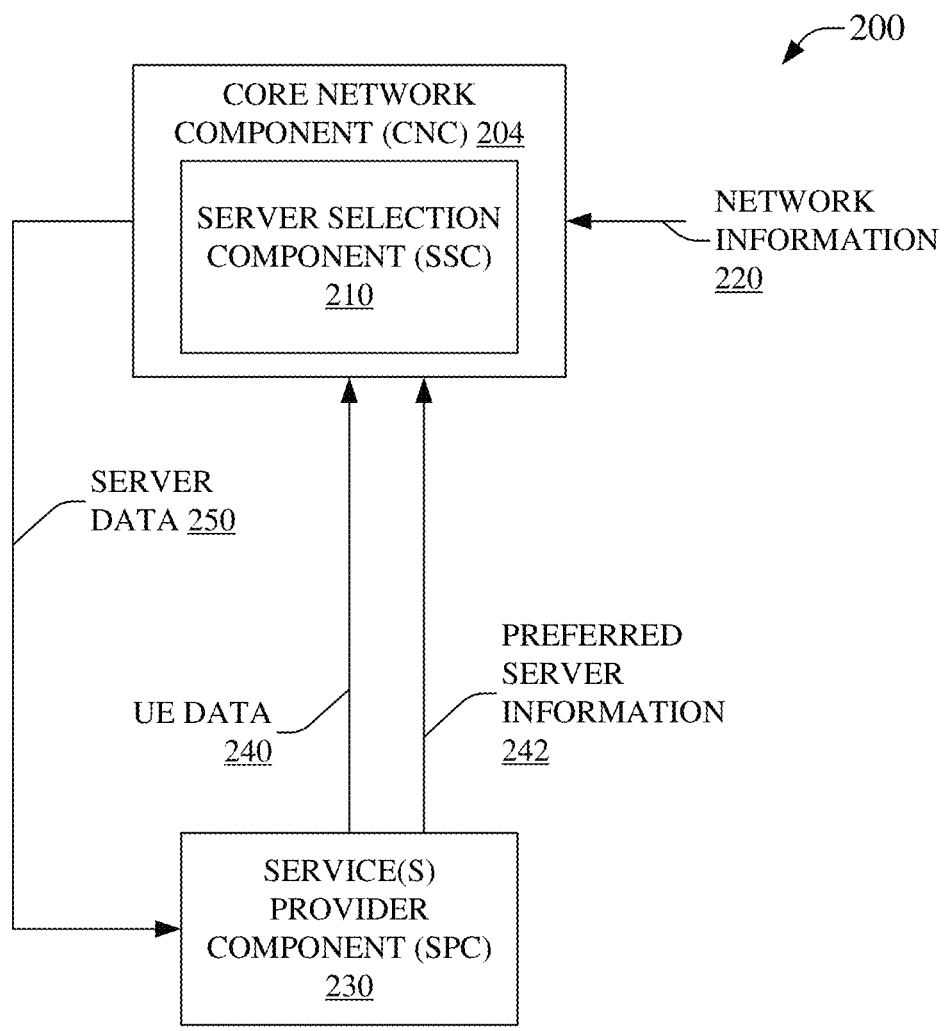
FIG. 2 is an illustration of an example system that can facilitate selecting, from among a group of preferred servers, a server that can improve latency for communication with a service instance, in accordance with aspects of the subject disclosure.

FIG. 2 is an illustration of a system 200, which can enable selecting, from among a group of preferred servers, a server that can improve latency relative to a service instance, in accordance with aspects of the subject disclosure. System 200 can comprise core network component (CNC) 204 that can comprise SSC 210. SSC 210 can receive UE data 240 that can comprise UE location information, identification of a service to be accessed, etc. UE data 240 can be received from SPC 230. UE data 240 can be determined by SPC 230 via communication with, monitoring of, etc., a server, a UE, a network data center (NDC), etc., communicatively coupled to a UE. As an example, a UE can indicate an intent to access a service instance to SPC 230 via a communication framework. This intent can be employed by SPC 230 to determine which servers currently host instances of the indicated service. SPC 230 can generate UE data 240 that can comprise a service identifier and a geographical location of the UE. SPC 230 can further generate preferred server information (PSI) 242 that can identify preferred servers that can comprise servers already determined to be hosting instances of the indicated service in this example. As such, in embodiments, SPC 230 can proved some constraint to server selection, for example, providing a list of preferred servers that already host a service instance can reduce the servers considered by SSC 210. It is noted that, in some embodiments, such example constraints can strictly constrain server selection, while, in some embodiments, the example constraints can loosely constrain server selection. As an example of strict constraint, SSC 210 can select only from servers corresponding to PSI 242. As an example of loose constraint, SSC 210 can select from a group of servers comprising servers corresponding to PSI 242. As another example of loose constraint, SSC 210 can select from servers and can increment a rank of servers corresponding to PSI 242, e.g., weighting preferred server rankings, etc., thereby supporting an indication that preferred servers are generally more favorable non-preferred servers, all else being equal, but that other ranking criteria can still result in a non-preferred server having a higher rank than a preferred server.

CNC 204 can receive network information 220 that can comprise topological information about network(s) to facilitate, via SSC 210, selection of a server based on topological distance(s). In some unillustrated embodiments CNC 204 can generate network information in addition to, or in lieu of, receiving network information 220. In embodiments, network information 220 can comprise other supplemental information that can be used for selecting a server, ranking a server, etc., supplemental information can comprise pricing, network/server status(es) that can include congestion information, maintenance information, historical performance information, etc., or other types of supplemental network information. In embodiments, supplemental information can be employed in determining server data 250.

CNC 204, via SSC 210, can determine server data 250, which can indicate a server, a ranking of server(s), an order of server selection, etc., that can be accessed by SPC 230. Server data 250 can be based on UE data 240, network information 220, etc. SPC 230, based on server data 250, can then facilitate access to a service instance at a selected server. In this regard, selection of a server can be based on topological distance, where topological distance can be a factor in core latency, and that selection can result in selecting a topologically closer server rather than selecting a geographically closer server. Moreover, where topologically closer and geographically closer are not mutually exclusive conditions, a topologically closer server can be selected where the selected server is also geographically closer than other servers, is not geographically closer than other servers, is geographically equidistant as other servers, etc. Furthermore, in some embodiments, a correlation between latency and topological distance can be validated, e.g., via ping component 462 of example system 400, etc. In this regard, where topological distance corresponds to latency, the topological distance, which can be known or computed, can be employed in server selection. However, where topological distance is determined not to correspond to latency, for example where a delay can be injected into a network path segment comprised in an end-to-end network path, then a measured latency value can be converted into an equivalent topological distance for use in selecting a server based on topological distances, e.g., a constructive topological distance determined from a latency measurement can be used as equivalent to a measured topological distance, which can compensate for network conditions that can cause discrepancies in a correlation between topological distance and measured latency.

In embodiments, server data 250 can indicate, to SPC 230, a server that is topologically closer to another endpoint, e.g., a UE, another server, a network datacenter, etc. In some embodiments, server data 250 can indicate a server that can already be hosting an instance of a service, which, for example, can be a server indicated in PSI 242. In some embodiments, server data 250 can indicate a server that may not already be hosting an instance of a service, e.g., a server that may not be a preferred server according to PSI 242, etc. In some embodiments, server data 250 can indicate a first server that already hosts a first instance of a service and a second server that does not already host a second instance of the service. In this regard, server ranking can indicate the first or second server as having a higher rank, however SPC 230 can select a lower ranked server, for example where a higher ranked server does not already host an instance of the service. In these embodiments, SPC 230 can enable service provider control enabling selection of a more latent server to avoid the cost of causing a new instance of the examples service to be hosted at a less latent server. However, where for example, PSI 242 indicates servers already hosting instances of a service and where SSC 210 increments rankings of PSC 242 servers, a service provider can select, e.g., via SPC 230 operations, a highest ranked server based on the rankings, even where that selection causes implementation of a new instance of a service at eh selected server.

Figure 3:
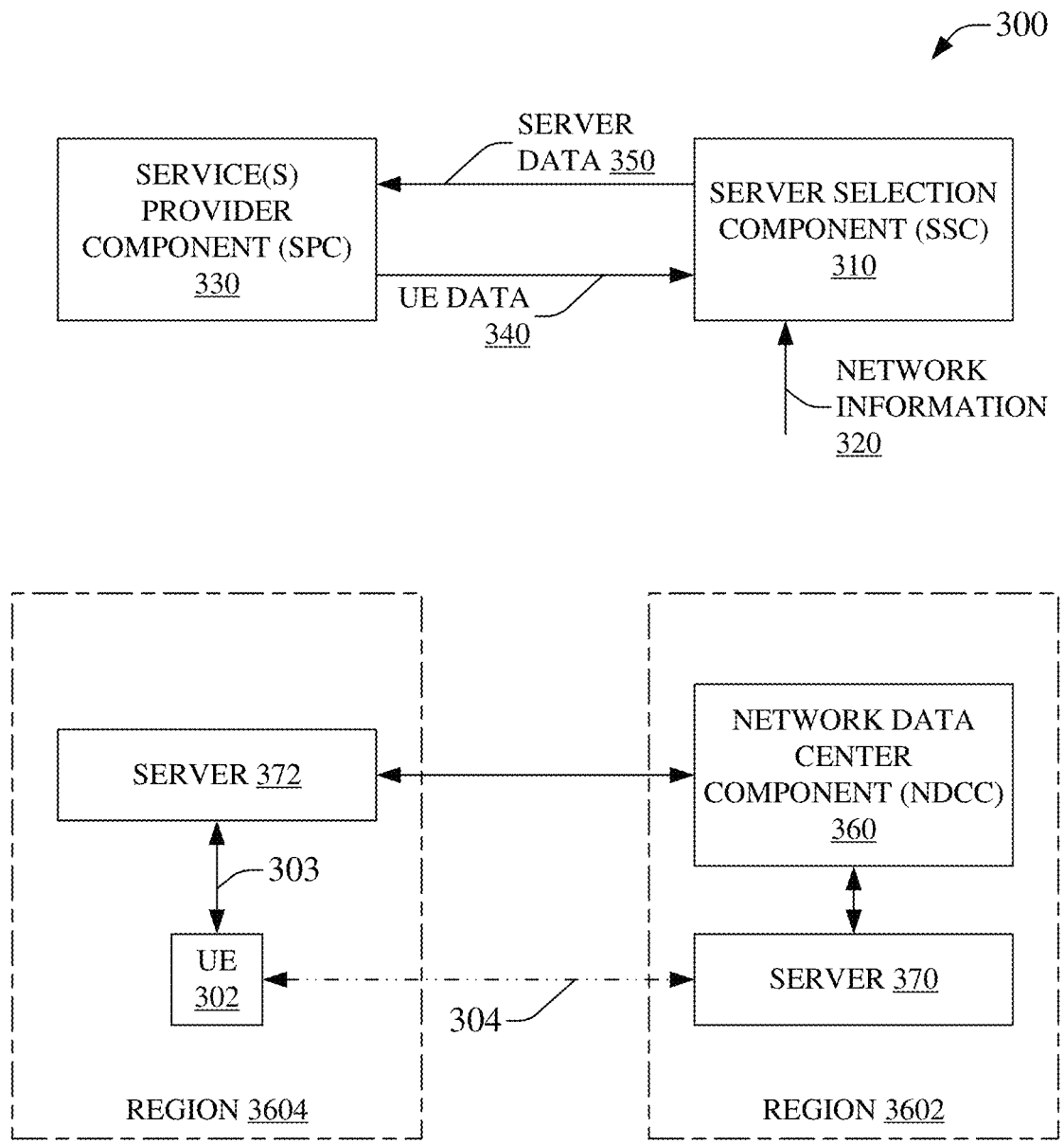
FIG. 3 is an illustration of an example system that can enable transitioning a user equipment from a first server in a first region to a second server in a second region different from the first region, wherein the second server is selected to improve latency relative to an instance of a service, in accordance with aspects of the subject disclosure.

FIG. 3 is an illustration of a system 300, which can facilitate transitioning a UE from a first server in a first region to a second server in a second region different from the first region, wherein the second server is selected to improve latency relative to an instance of a service, in accordance with aspects of the subject disclosure. System 300 can comprise SSC 310 that can receive UE data 340, corresponding to UE 302, which can comprise UE location information, identification of a service to be used, etc. UE data 340 can be received from SPC 330. UE data 340 can be determined by SPC 330 via communication with a network connected to UE 302, e.g., communication with, monitoring of, etc., UE 302 via UE 302 itself or with a communication framework component supporting UE 302, such as server 372, NDCC 360, etc.

SSC 310 can receive network information 320 that can comprise topological information about a network to facilitate selection of a server based on topological distance(s). In embodiments, network information 320 can be received from NDCC 360, or other network components, systems, devices, equipment, etc. Network information 320 can, in some embodiments, comprise other supplemental information, such as pricing, network/server status(es) that can include congestion information, maintenance information, historical performance information, etc., or other types of supplemental network information. In embodiments, supplemental information can be employed in determining server data 250, ranking a server, selecting a server, etc.

SSC 310 can determine server data 350, which can indicate a server, a ranking of server(s), an order of server selection, etc., that can be accessed by SPC 330. Server data 350 can be determined by SSC 310, and can be based on UE data 340, network information 320, etc., corresponding to UE 302. In an example, UE 302 can be connected to server 372 in region 3604. Server 372, for example, can then also be connected to NDCC 360 in region 3602. NDCC 360 can enable UE 302 to access, via server 372, other endpoint devices via a communications framework, and in some embodiments, the communications framework can comprise network components of a wired/wireless network corresponding to NDCC 360. Continuing the example, NDCC 360 can be connected to server 370 that, similar to server 372, can facilitate connections between endpoint devices via a communications framework that, in some embodiments, can comprise network components of a network corresponding to NDCC 360. In this example, region 3604 can be located remotely from region 3602. However, the disclosed subject matter is not so limited and, in some embodiments, regions 3604 and 3602 can be a same region, regions 3604 and 3602 can overlap, region 3604 can comprise region 3602, region 3602 can comprise region 3604, etc.

In this example, server data 350 can indicate that server 370 is higher ranked than server 372, e.g., server 370 can be topologically closer to another endpoint than server 372. Accordingly, the latency between server 370 and another endpoint can be better than a latency between server 372 and the other endpoint. In this regard, where lower core latency is available a QoE for use of a service instance hosted at 370 can be improved in comparison to a server instance hosted on server 372. SPC 330 can select server 370, based on server data 350, which can result in UE 302 establishing connection 304 between UE 302 and server 370 to access an instance of a service hosted on server 370. Moreover, in some embodiments, connection 303 can be terminated, via SPC 330 based on server data 350. As before, it is noted that topologically closer and geographically closer conditions are generally not mutually exclusive conditions and, as such, a topologically closer server can be selected where the selected server is also geographically closer than other servers, is not geographically closer than other servers, is geographically equidistant as other servers, etc. In this regard, in some embodiments, server 370 in region 3602 can be topologically closer to, and geographically more distant than, the other example endpoint than server 372 in region 3604 is. Further, in some other embodiments, server 370 in region 3602 can be topologically closer to, and geographically closer to, the other example endpoint than server 372 in region 3604 is.

Figure 4:
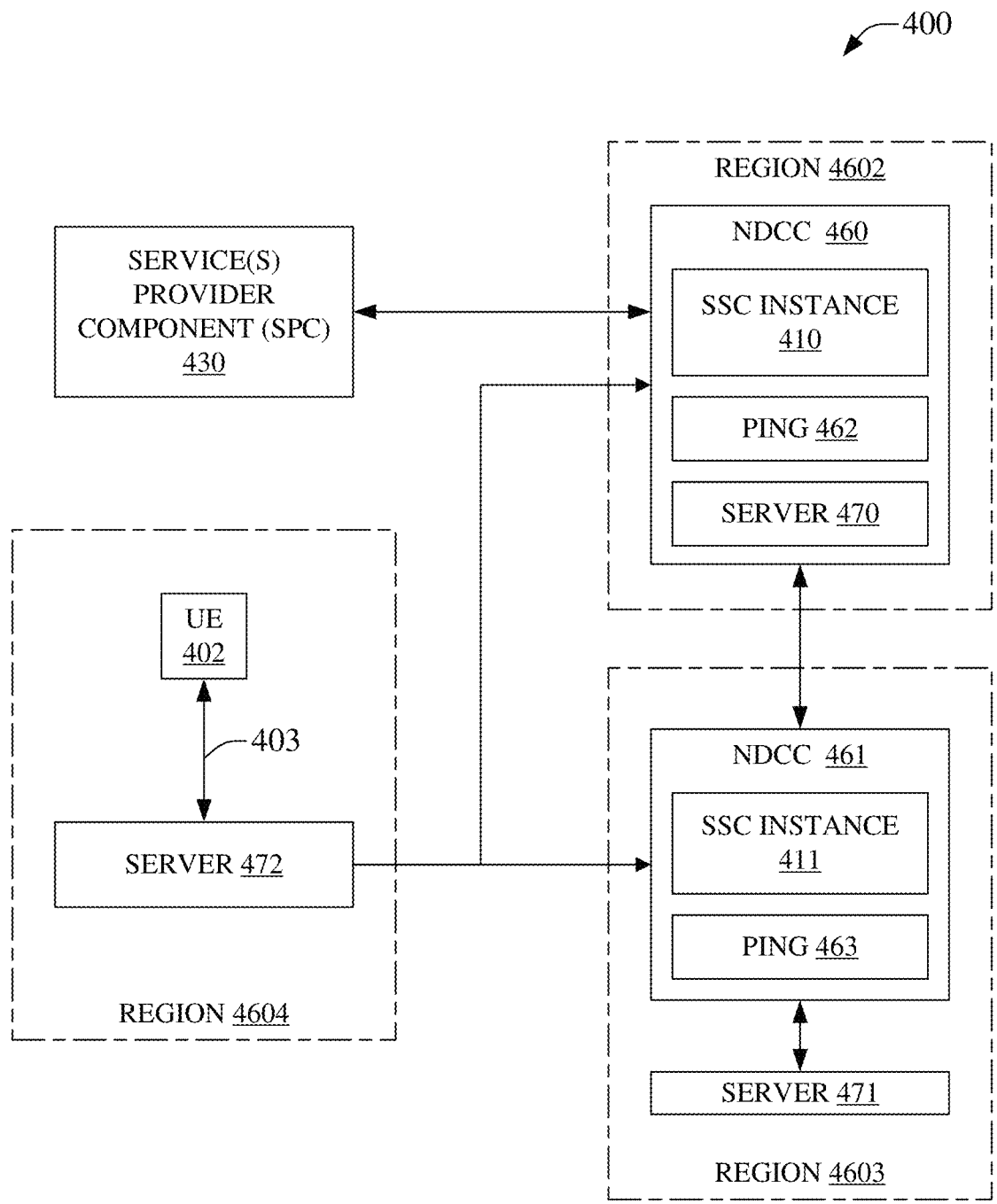
FIG. 4 illustrates an example system that can facilitate selecting, via coordination of service selection component instances, a server that can improve latency relative to a service instance, in accordance with aspects of the subject disclosure.

FIG. 4 is an illustration of a system 400, which can enable selecting, via coordination of SSC instances, a server that can improve latency relative to a service instance, in accordance with aspects of the subject disclosure. System 400 can comprise NDCC 460 that can be located in region 4602. NDCC 460 can, for example, comprise SSC instance 410, server 470, and a ping component, e.g., ping 462. SSC instance 410 can receive UE data, corresponding to UE 402, which can comprise UE location information, identification of a service to be used, etc. UE data can be received from SPC 430. UE data can be determined by SPC 430 via communication with a network connected to UE 402, e.g., communication with, monitoring of, etc., UE 402 via UE 402 itself or with a communication framework component supporting UE 402, such as server 472, NDCC 460, 461, etc.

SSC instance 410 can receive network information that can comprise topological information about a network to facilitate selection of a server based on topological distance(s). In embodiments, network information can be received from NDCC 460, 461, etc., or other network components, network systems, network devices, network equipment, etc. Network information can, in some embodiments, comprise supplemental information, such as latency measurement measured by network component(s) such as ping 462, pricing, network/server status(es) that can include congestion information, maintenance information, historical performance information, etc., or other types of supplemental network information. In embodiments, supplemental information can be employed in determining server data, ranking a server, selecting a server, etc.

In embodiments of the disclosed subject matter, region 4603 can comprise NDCC 461 that can comprise SSC instance 411, ping 463, etc. SSC instance 411 can be the same as, or similar to SSC instance 410. SSC instance(s) 410, 411, etc., can determine server data, which can indicate a server, a ranking of server(s), an order of server selection, etc., that can be accessed by SPC 430. Server data can be based on UE data, network information, etc., corresponding to UE 402. In an example, UE 402 can be connected to server 472 in region 4604. Server 472, for example, can then also be connected to one or more of NDCC 460, 461, etc. NDCC 460, 461, etc., can enable UE 402 to access, via server 472, other endpoint devices via a communications framework, and in some embodiments, the communications framework can comprise network components of a wired/wireless network corresponding to NDCC 460, 461, etc. Continuing the example, NDCC 460 can comprise server 470 that, similar to server 472, can facilitate connections between endpoint devices via a communications framework that, in some embodiments, can comprise network components of a network corresponding to NDCC 460. Further continuing the example, NDCC 461 can be connected to server 471 of region 4603 that, similar to server 470, 472, etc., can facilitate connections between endpoint devices via a communications framework that, in some embodiments, can comprise network components of a network corresponding to NDCC 461. Region 4604 can be located remotely from region 4602, which can be located remotely from region 4603. However, the disclosed subject matter is not so limited and, in some embodiments, one or more of regions 4604, 4603, and 4602 can be a same region, one or more of regions 4604, 4603, and 4602 can overlap, a region, e.g., 4602 to 4604, can comprise another region, e.g., 4602-4602, etc. As an example, region 4603 can be a subregion of region 4602. As a further example, region 4604 can be a subregion of region 4603, which can be a subregion of region 4602, e.g., nested regions such as where region 4602 can comprise region 4603 that itself can comprise region 4604, etc.

In an example, server data can indicate that server 470 is higher ranked than server 471, which can be higher ranked than server 472, e.g., server 470 can be topologically closer to another endpoint than server 471 and server 471 can be topologically closer to the other endpoint than server 472. Accordingly, the latency between server 470 and another endpoint can be better than latency between server 471 and the other endpoint and better than the latency between server 472 and the other endpoint. In this regard, where lower core latency is available via server 470, a QoE for use of a service instance hosted at server 470 can be improved in comparison to a server instance hosted on server 471, 472, etc. SPC 430 can select server 470, based on server data, which can result in UE 402 establishing connection between UE 402 and server 470 to access an instance of a service hosted on server 470. Moreover, in some embodiments, SPC 430 can cause other connections, e.g., between UE 402 and server 472, between UE 402 and server 471, etc., to be terminated based on the server data. As before, it is noted that topologically closer and geographically closer conditions are generally not mutually exclusive conditions and, as such, a topologically closer server can be selected where the selected server is also geographically closer than other servers, is not geographically closer than other servers, is geographically equidistant as other servers, etc.

As has been disclosed elsewhere herein, embodiments of the disclosed subject matter can comprise an SSC instance, e.g., SSC instance 410, 411, etc. In some embodiments, an SSC instance can be a component communicatively connected to a core network, comprised in a core network, etc. In some embodiments, an SSC can be comprised in a CNC. In embodiments, there can be more than one instance of an SSC that can act independently, e.g., SSC instance 410 can act independently from SSC 411, etc., cooperatively e.g., SSC instance 410 can cooperate with SSC 411, etc., hierarchically, e.g., a SSC instance 411 can be a first tier of SSC instances acting subordinate to second tier SSC instance(s) that can be embodied in example SSC instance 410, etc., and/or as a distributed SSC, e.g., SSC instances 410, 411, etc., can interact as a single SSC, etc.

In embodiments, ping 462, 463, etc., can facilitate measurement of latency between endpoints. A measured latency can be used to validate that a topological distance is an acceptable replacement for actual measured latency, which can be based on the speed of light in the network path medium and the known, or easily determined, distance the signal traverses. This can be analogous to checking the accuracy of a vehicle speedometer by driving a known distance in a known time enables determining a speed and, where the determined speed matches the speedometer indication, the speedometer reading can be accepted as sufficiently accurate to avoid repeated measuring speed as a function of time and distance. Accordingly, where a measured latency is determined to be sufficiently accurate to a topological distance, then the topological distance can be used in lieu of repeatedly measuring contemporaneous latency values. Moreover, where the distance is determined to be inaccurate relative to the measured latency, further measured latencies can be converted into constructive topological distances for use in selecting a server according to the instant disclosure, e.g., the measured latency and the speed of light in the path medium can be used to determine a constructive topological distance that can be used where latency validation of the measured topological distance is determined not to be sufficiently accurate. Moreover, where topologically closer and geographically closer are not mutually exclusive conditions, a topologically closer server can be selected where the selected server is also geographically closer than other servers, is not geographically closer than other servers, is geographically equidistant as other servers, etc.

Figure 5:
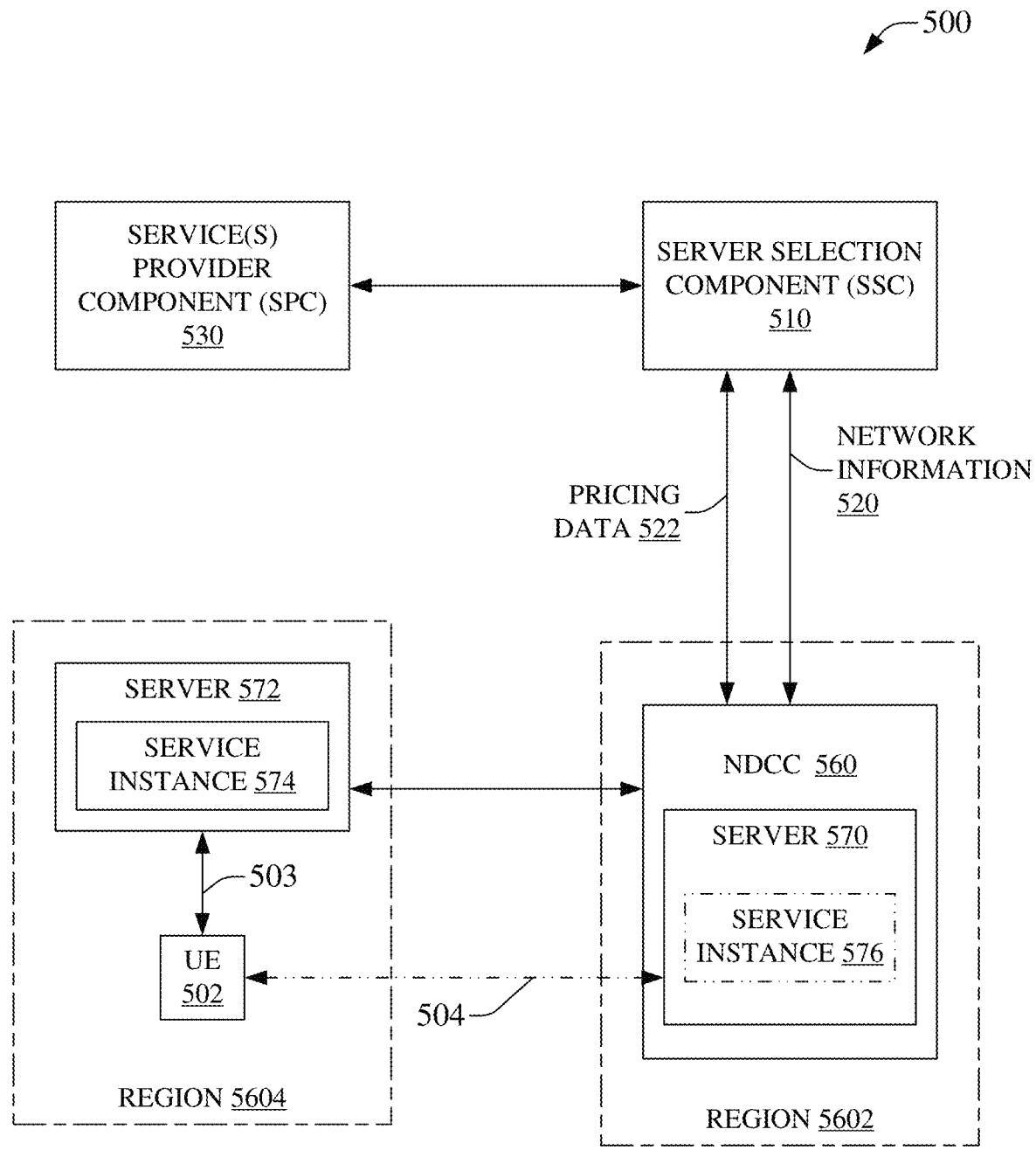
FIG. 5 illustrates an example system that can enable selecting a server, based on pricing instantiation of an instance of a service, that can improve latency relative to the instance of the service, in accordance with aspects of the subject disclosure.

FIG. 5 is an illustration of a system 500, which can facilitate selecting a server, based on pricing instantiation of an instance of a service, that can improve latency relative to the instance of the service, in accordance with aspects of the subject disclosure. System 500 can comprise SSC 510 that can receive UE data, corresponding to UE 502, which can comprise UE location information, identification of a service to be used, etc. UE data can be received from SPC 530. UE data can be determined by SPC 530 via communication with a network connected to UE 502, e.g., communication with, monitoring of, etc., UE 502 via UE 502 itself or with a communication framework component supporting UE 502, such as server 572, NDCC 560, etc.

SSC 510 can receive network information 520 that can comprise topological information about a network to facilitate selection of a server based on topological distance(s). In embodiments, network information can be received from NDCC 560, or other network components, systems, devices, equipment, etc. Network information 520 can, in some embodiments, comprise other supplemental information, such as pricing, network/server status(es) that can include congestion information, maintenance information, historical performance information, etc., or other types of supplemental network information. In embodiments, supplemental information can be employed in determining server data, ranking a server, selecting a server, etc.

SSC 510 can determine server data, which can indicate a server, a ranking of server(s), an order of server selection, etc., that can be accessed by SPC 530. Server data can be determined by SSC 510, and can be based on UE data, network information 520, etc., corresponding to UE 502. In an example, UE 502 can be connected to server 572 in region 5604. Server 572, for example, can then also be connected to NDCC 560 in region 5602. NDCC 560 can enable UE 502 to access, via server 572, other endpoint devices via a communications framework, and in some embodiments, the communications framework can comprise network components of a wired/wireless network corresponding to NDCC 560. Continuing the example, NDCC 560 can comprise server 570 that, similar to server 572, can facilitate connections between endpoint devices via a communications framework that, in some embodiments, can comprise network components of a network corresponding to NDCC 560. In this example, region 5604 can be located remotely from region 5602. However, the disclosed subject matter is not so limited and, in some embodiments, regions 5604 and 5602 can be a same region, regions 5604 and 5602 can overlap, region 5604 can comprise region 5602, region 5602 can comprise region 5604, etc.

In this example, server data can indicate that server 570 is higher ranked than server 572, e.g., server 570 can be topologically closer to another endpoint than server 572. Accordingly, the latency between server 570 and another endpoint can be better than a latency between server 572 and the other endpoint. In this regard, where lower core latency is available a QoE for use of a service instance hosted at 570 can be improved in comparison to a server instance hosted on server 572. In some embodiments, server 570, when selected, may not comprise an instance of a service, e.g., service instance 576. As such, selecting server 570 can correspond to instantiating service instance 576. However, instantiating service instance 576 can be associated with monetary cost to a service provider entity corresponding to SPC 530. Accordingly, pricing data 522 can be determined for instantiating service instance 576. Pricing data 522 can be communicated to SPC 530, e.g., via SSC 510. In some embodiments, pricing data 522 can be determined by SSC 510. In other embodiments, pricing data 522 can be determined by NDCC 560 or a component thereof, e.g., server 570, etc. Pricing data 522 can be employed by SPC 530 in determining if server 570 is to be selected, e.g., if the cost is excessive, then SPC 530 can select another server, for example a server already hosting a service instance, e.g., service instance 574 hosted by server 572. However, where the cost of instantiating service instance 576 is determined to be acceptable via SPC 530, then server 570 can be selected, and instantiating service instance 576 can be performed, to enable improved latency and QoE where UE 502 is instructed to establish connect 504 to service instance 576 of server 570. In some embodiments, SPC 530 can instruct that connection 503 between UE 502 and server 572 hosting service instance 574 be terminated.

Accordingly, SPC 530 can select server 570, based on server data, pricing data 522, etc., which can result in UE 502 establishing connection 504 between UE 502 and server 570 to access an instance of a service hosted on server 570, e.g., service instance 576, which in some embodiments can be a newly instantiated service instance. Again, as before, it is noted that topologically closer and geographically closer conditions are generally not mutually exclusive conditions and, as such, a topologically closer server can be selected where the selected server is also geographically closer than other servers, is not geographically closer than other servers, is geographically equidistant as other servers, etc. In this regard, in some embodiments, server 570 in region 5602 can be topologically closer to, and geographically more distant than, the other example endpoint than server 572 in region 5604 is to the other endpoint. Further, in some other embodiments, server 570 in region 5602 can be topologically closer to, and geographically closer to, the other example endpoint than server 572 in region 5604 is to the other endpoint.

Figure 6:
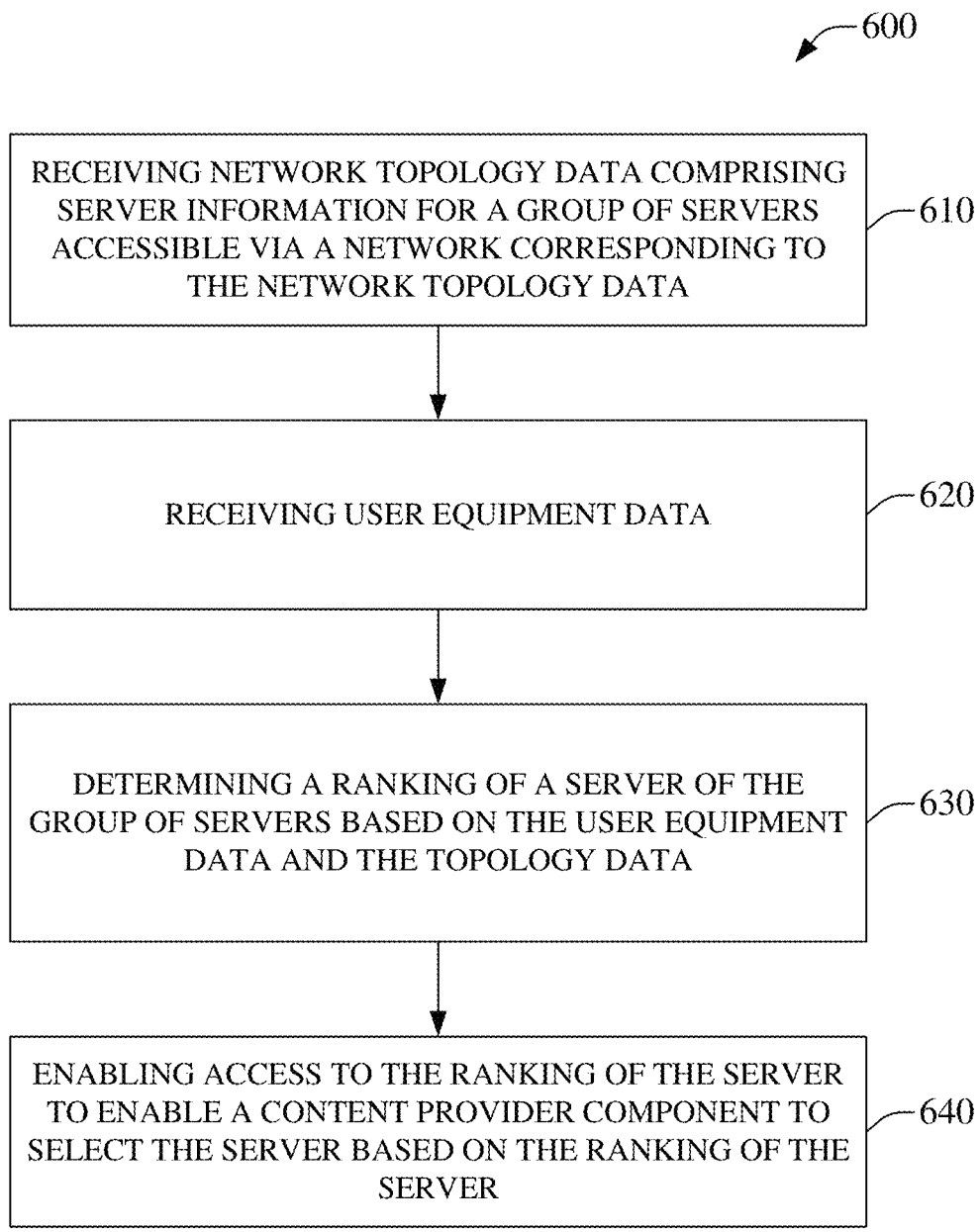
FIG. 6 is an illustration of an example method enabling selecting a server that can improve latency relative to a service instance, in accordance with aspects of the subject disclosure.
Figure 7:
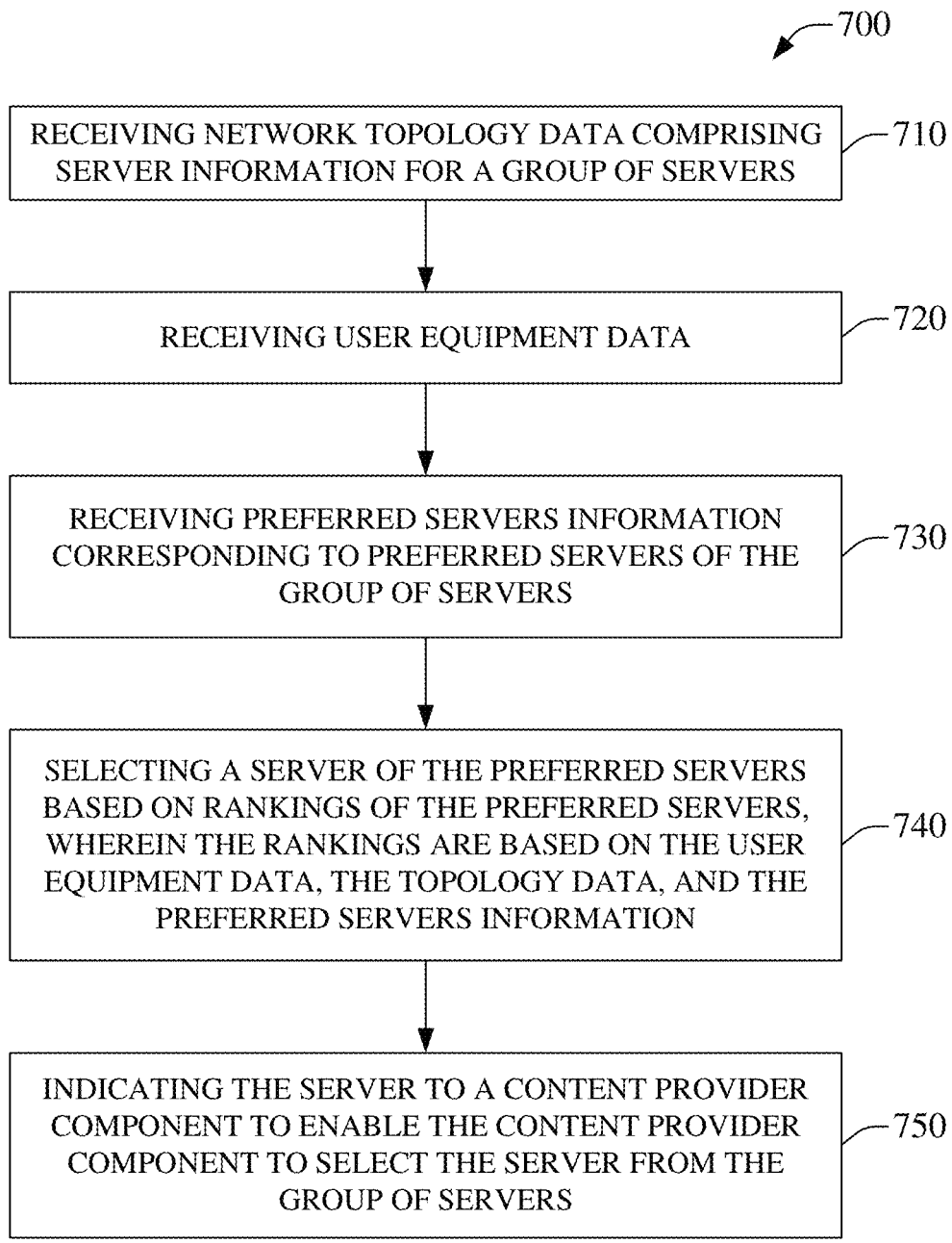
FIG. 7 illustrates an example method, enabling selecting a server, from among a group of preferred servers, that can improve latency relative to a service instance, in accordance with aspects of the subject disclosure.
Figure 8:
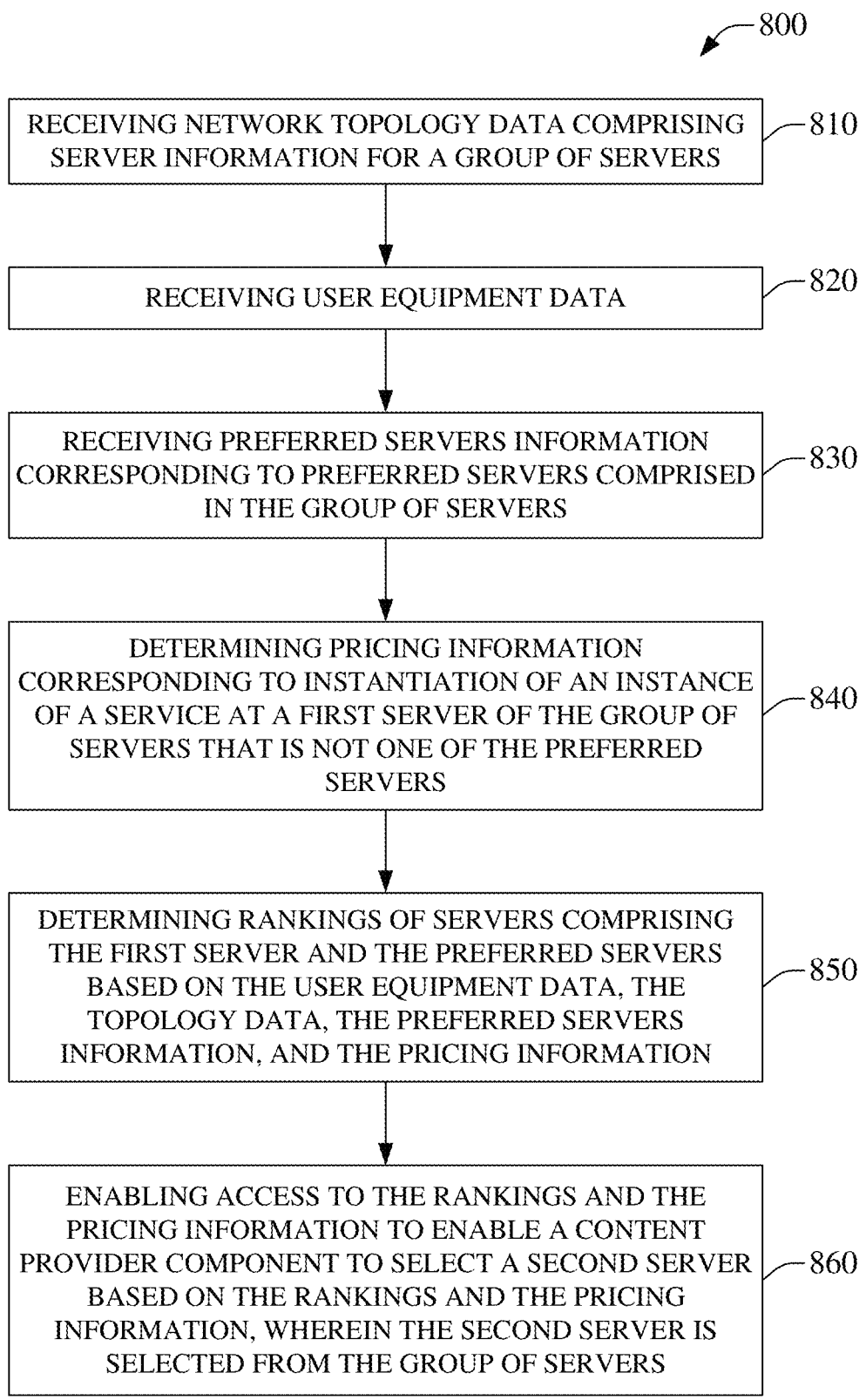
FIG. 8 illustrates an example method, facilitating selecting a server, based on pricing to instantiate a process on the server, that can improve latency relative to a service instance, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of example method 600, which can facilitate selecting a server that can improve latency relative to a service instance, in accordance with aspects of the subject disclosure. System 600 can comprise receiving network topology data comprising server information for a group of servers accessible via a network corresponding to the network topology data. Topological information about a network can facilitate selection of a server based on topological distance(s) between endpoints. In embodiments, network topology data can be received from an NDCC, e.g., NDCC 160, etc., or other network components, systems, devices, equipment, etc. In some embodiments, network topology data can accompany other/supplemental network information, such as pricing, network/server status(es) that can include congestion information, maintenance information, historical performance information, etc., or other types of network information. This supplemental information can be employed in server selection, to refine selection, determining ranking of severs, etc.

At 620, method 600 can comprise receiving UE data. UE data can comprise UE location information, identification of a service to be used, etc. In some embodiments, UE data can be used to determine a type of data communication asymmetry, if any, which UE data can be employed in server selection. UE data can comprise other UE related information, for example, geographic location of a UE, latency tolerance value(s), subscriber information related to a service, subscriber information related to wired/wireless network access, etc., any of which can facilitate selection of a server. With regard to data communication asymmetry, selection of a server seeking to improve QoE via latency improvement can benefit from considering which parts of a communication path are communicating more data, e.g., reducing latency for more heavily used data path portions can have a greater impact on improving latency than reducing latency for a more lightly used data path portion. As an example, where a UE sends a request to a server and then the server heavily communicates with another server to aggregate data corresponding to the query, then it can be readily appreciated that improving latency between the two servers can be more impactful on total latency than improving latency between the UE and the initial server.

Method 600, at 630, can comprise determining a ranking of a server of the group of servers based on the user equipment data and the topology data. A server rank, for example, can be incremented where a topological distance between the server and another endpoint is smaller than between another server and the other endpoint, and decremented where the topological distance is greater. In another example, a server rank can be incremented where the server hosts an instance of a service that the UE has indicated will be used, and decremented where the server does not host the instance. Where data communication asymmetry, for example, indicates a UE heavy asymmetry, a server rank can be incremented where the server is topologically closer to the UE, and decremented where the server is topologically closer to another endpoint. However, for example, where data communication asymmetry indicates a server heavy asymmetry, a server rank can be decremented where the server is topologically closer to the UE, but incremented where the server is topologically closer to another endpoint.

At 640, method 600 can comprise enabling access to the ranking of the server to enable a content provider component to select the server based on the ranking of the server. Method 600 can end at this point. In some embodiments, rankings can be accessed by another device, for example, a content provider component, etc., and the rankings can enable the other device to select the server based on the ranking. In some embodiments, a system performing example method 600 can select a server and provide the ranking of the selected server, leaving a content provider component with little other choice than to select the server, e.g., providing only one ranking can result in the content provider component having only one choice of server. However, generally, practice of example method 600 can provide server rankings and allow an example content provider component to select a server based, at least in part, on the provided rankings. In this regard, a network operator can typically have best access to network topology information, including topological distance information. Accordingly, a network operator can, based on criteria comprised in UE data, rank servers by topological distance(s), or other network information readily available to a network operator. This ranking can then be provided to a content provider component to allow the content provider component to select which of the servers is best for their requests or needs, which selection can be based on the ranking provided by an example network operator.

FIG. 7 illustrates example method 700 that facilitates selecting a server, from among a group of preferred servers, that can improve latency relative to a service instance, in accordance with aspects of the subject disclosure. Method 700, at 710, can comprise receiving network topology data comprising server information for a group of servers accessible via a network corresponding to the network topology data. Topological information about a network can facilitate selection of a server based on topological distance(s) between endpoints. In some embodiments, network topology data can accompany other/supplemental network information, such as pricing, network/server status(es) that can include congestion information, maintenance information, historical performance information, etc., or other types of network information. This supplemental information can be employed in server selection, to refine selection, determining ranking of severs, etc.

At 720, method 700 can comprise receiving UE data. UE data can comprise UE location information, identification of a service to be used, etc. In some embodiments, UE data can be used to determine a type of data communication asymmetry, if any, which UE data can be employed in server selection. UE data can comprise other UE related information, for example, geographic location of a UE, latency tolerance value(s), subscriber information related to a service, subscriber information related to wired/wireless network access, etc., any of which can facilitate selection of a server.

Method 700, at 730, can comprise receiving preferred server(s) information corresponding to preferred server(s) of the group of servers. Preferred server information, in some embodiments, can be provided by a content provider component and can indicate servers preferred by a corresponding content provider entity. This preference for server(s), for example, can be based on identifying server(s) on which a service provided by the content provider is already hosted. As an example, a content provider can have service instances on three servers and can provide an indication of these three servers in preferred server(s) information received at 730. In this example, a preferred server's rank can be incremented relative to an unprefered server rank, which can result in increasing the likelihood a server already hosting an instance of a service will be selected. However, in this example, where unprefered servers are higher ranked, for example, due to being topologically closer to another endpoint device, even a preferred server may not be selected due to the higher ranking of the unprefered server. In this example, where an unprefered server is selected, an instance of the service would then be instantiated at the selected server to support the UE use of the service. In some embodiments, preferred server information can be a loose constraint, e.g., preferred servers can be favored but other unprefered servers can also be ranked. However, in some embodiments, preferred server information can be a strictly constraint, e.g., only preferred server can be ranked by method 700.

Method 700, at 740, can comprise selecting a server of the preferred server(s) based on ranking(s) of the preferred server(s). The ranking of a preferred server can be based on the UE data, the topology data, and the preferred server(s) information. A server rank, for example, can be incremented where a topological distance between the server and another endpoint is smaller than between another server and the other endpoint, and decremented where the topological distance is greater. In another example, a preferred server rank can be incremented where the server is a preferred server, for example a sever that already hosts an instance of a service that the UE has indicated will be used.

At 750, method 700 can comprise indicating the server to a content provider component to enable the content provider component to select the server from the group of servers. Method 700 can end at this point. In some embodiments, rankings can also be indicated to the content provider component to enable the content provider component to select between the server and another server based on the ranking. Method 700 however indicates that a system performing the method can select a server and can indicate that selection to the content provider component, which can force the system selected server to be used. This system selection of the server, as illustrated at 740, can be based on a presumption that a network operator can typically have best access to network topology information, including topological distance information, and therefore the network operator, via the system, can be in a best position to select a server from the preferred servers indicated to the system. In part, example method 700 is included in the disclosure to complement example method 600, e.g., method 700 can comprise system section of a server, while method 600 can comprise providing information to a device external to the system to facilitate serve selection by the device rather than the system. As such, method 700 is intended to illustrate an example method in which a system can select a server, however method 700 is not intended to limit other embodiments of the disclosed subject matter in which the external selection of a server can be based on ranking information determined by a system.

FIG. 8 illustrates example method 800 comprising determining pricing for instantiating a process on the server to facilitate selecting a server that can improve latency relative to a service instance, in accordance with aspects of the subject disclosure. At 810, method 800 can comprise receiving network topology data comprising server information for a group of servers accessible via a network corresponding to the network topology data. Topological information about a network can facilitate selection of a server based on topological distance(s) between endpoints. In some embodiments, network topology data can accompany other/supplemental network information, such as pricing, network/server status(es) that can include congestion information, maintenance information, historical performance information, etc., or other types of network information. This supplemental information can be employed in server selection, to refine selection, determining ranking of severs, etc.

At 820, method 800 can comprise receiving UE data. UE data can comprise UE location information, identification of a service to be used, etc. In some embodiments, UE data can be used to determine a type of data communication asymmetry, if any, which UE data can be employed in server selection. UE data can comprise other UE related information, for example, geographic location of a UE, latency tolerance value(s), subscriber information related to a service, subscriber information related to wired/wireless network access, etc., any of which can facilitate selection of a server.

Method 800, at 830, can comprise receiving preferred server(s) information corresponding to preferred server(s) of the group of servers. Preferred server information, in some embodiments, can be provided by a content provider component and can indicate servers preferred by a corresponding content provider entity. This preference for server(s), for example, can be based on identifying server(s) on which a service provided by the content provider is already hosted, e.g., a server with an existing service instance, etc. Receiving an indication of preferred server(s) can alter a rank of the preferred server, e.g., a preferred server's rank can be incremented relative to an unprefered server's rank, which can result in increasing the likelihood a preferred server will be selected. In some embodiments, preferred server information can be a strict constraint, e.g., only preferred server can be ranked by method 800, for example in method 700. However, in some embodiments, preferred server information can be a loose constraint, e.g., preferred servers can be favored but other unprefered servers can also be ranked.

At 840, method 800 can comprise determining pricing information corresponding to a future instantiation of an instance of a service at a first server of the group of servers, wherein the first server is not a preferred server. This can be an example of preferred server information being a loose constraint, e.g., unprefered server(s) can be considered in addition to preferred server(s). In example method 800, a preferred servers can already host an instance of a service and, accordingly, an unprefered server can lack a hosted instance of the service. As such, pricing information to instantiate an instance of the service at a server that is not a preferred server can be understood to be a selection criterion, e.g., price can be balanced against latency improvement in selection of a server. In an example, a non-preferred server can be selected due to improved core latency where the cost to add the hosted instance to the non-preferred server is acceptable.

Method 800, at 850, can comprise determining rankings of servers comprising the first server and the preferred server(s) based on the user equipment data, the topology data, the preferred server(s) information, and the pricing information. A server rank, for example, can be incremented where a topological distance between the server and another endpoint is smaller than between another server and the other endpoint, and decremented where the topological distance is greater. In another example, a server rank can be incremented where the server hosts an instance of a service and can be decremented where the server does not host the instance. In a further example, a rank of a preferred server can be incremented based on being a preferred server. In an additional example, a cost to instantiate an instance of a service can alter server rankings, e.g., a lower cost server can be higher ranked than a higher cost server where other ranking criteria are the same or similar.

At 860, method 800 can comprise enabling access to the rankings and the pricing information to enable a content provider component to select a second server from the group of servers based on the rankings and the pricing information. Method 800 can end at this point. In some embodiments, the rankings can be accessed by another device, for example, a content provider component, etc., and the rankings can enable the other device to select the server based on the ranking. In some embodiments, pricing information can also be accessed by another device, for example, a content provider component, etc., and the pricing information can be used by the other device in selection of the server in addition to the ranking of the server. As an example, a highly ranked server can correspond to a prohibitively high price to host a service instance. In this example, a content provider component can refuse to select the server, despite the high rank, for example, based on the prohibitive pricing. In another example, a content provider component can use a price threshold value to filter accessed rankings of servers, e.g., a content provider component can select a server only from ranked servers with pricing below the example price threshold value. As such, method 800 can provide server rankings and pricing to allow an example content provider component to select a cost-effective server, that can improve latency, based on the provided rankings.

Figure 9:
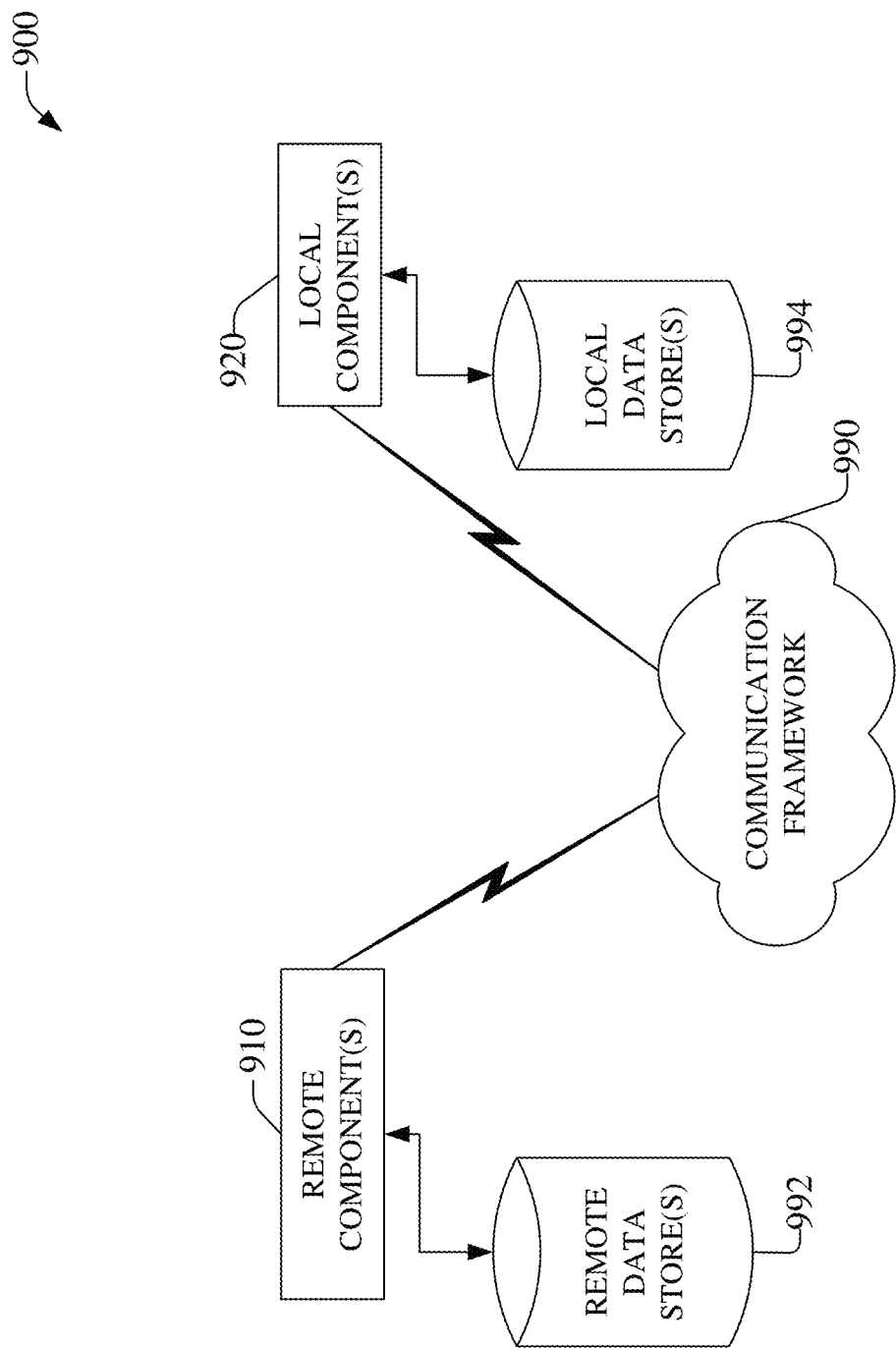
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise SSC 110-510, SSC instance 410-411, etc., SPC 130-530, etc., server 170, 370, 372, 470, 471, 472, etc., UE 102, 302, 402, 502, etc., NDCC 160, 360, 460-461, 560, etc., CNC 204, etc., ping 462, 463, etc., or any other component that is located remotely from another component of systems 100-500, etc.

The system 900 also comprises one or more local component(s) 920. The local component(s) 920 can be hardware and/or software (e.g., threads, processes, computing devices). In some embodiments, local component(s) 920 can comprise SSC 110-510, SSC instance 410-411, etc., SPC 130-530, etc., server 170, 370, 372, 470, 471, 472, etc., UE 102, 302, 402, 502, etc., NDCC 160, 360, 460-461, 560, etc., CNC 204, etc., ping 462, 463, etc., or any other component that is located local to another component of systems 100-500, etc. As one of many possible examples, SSC instance 410 can be comprised in NDCC 460 and can be connected to a remotely located SCC instance 411 comprised in NDCC 461, local server 470, remotely located servers 471 and 472, UE 402, and remotely located SPC 430, wherein servers 471 and 472 can also be remotely located from each other. Information, such as UE data 140, server data 150, network information 120, pricing data 522, data arising from use of a service instance, e.g., 574, 576, etc., by UE 502, etc., or nearly any other information, can be communicated between local and remotely located components via a communications framework, such as communication framework 990, etc., in this example.

One possible communication between remote component(s) 910 and local component(s) 920 can be in the form of a data packet adapted to be transmitted between two or more computer processes. Another possible communication between remote component(s) 910 and local component(s) 920 can be in the form of circuit-switched data adapted to be transmitted between two or more computer processes in radio time slots. The system 900 comprises a communication framework 990 that can comprise path segments, path parts, etc., that can be employed to facilitate communications between the remote component(s) 910 and the local component(s) 920, and can comprise a fiber segment, metal segment, e.g., copper segment, etc., an air interface segment, e.g., Uu interface of a UMTS network, via a long-term evolution (LTE) network, 5G, 6G, and/or another path segment. Remote component(s) 910 can be operably connected to one or more remote data store(s) 992, such as a hard drive, solid state drive, SIM card, eSIM, device memory, etc., that can be employed to store information on the remote component(s) 910 side of communication framework 990. Similarly, local component(s) 920 can be operably connected to one or more local data store(s) 994, that can be employed to store information on the local component(s) 920 side of communication framework 990. As in a previous example, SSC instance 410 can be comprised in NDCC 460 and can be connected to a remotely located SCC instance 411 comprised in NDCC 461, local server 470, remotely located servers 471 and 472, UE 402, and remotely located SPC 430, wherein servers 471 and 472 can also be remotely located from each other. Information, such as UE data 140, server data 150, network information 120, pricing data 522, data arising from use of a service instance, e.g., 574, 576, etc., by UE 502, etc., or nearly any other information, can be communicated between local and remotely located components via a communications framework, such as communication framework 990, etc., in this example.

Figure 10:
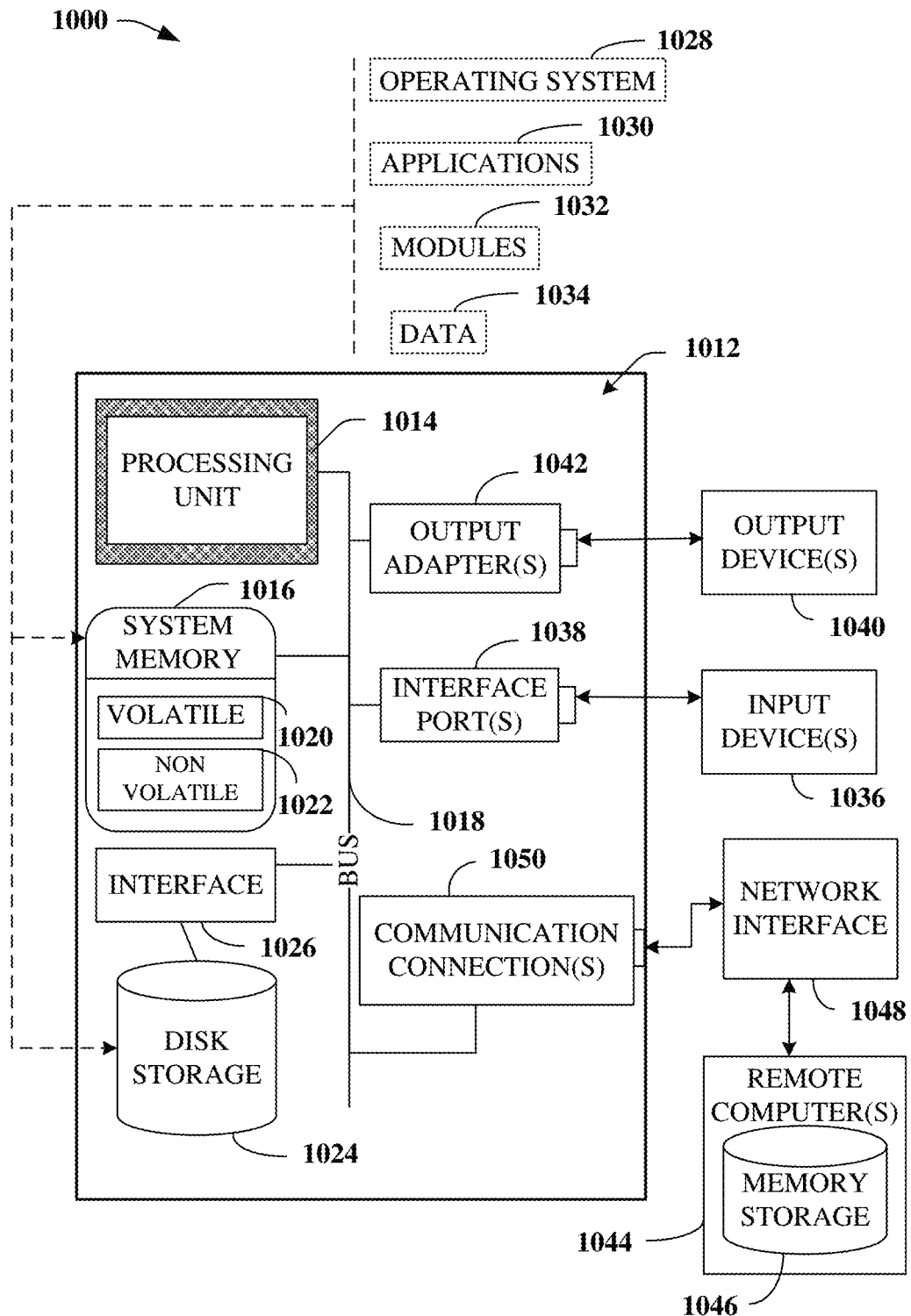
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random-access memory, synchronous dynamic random-access memory, double data rate synchronous dynamic random-access memory, enhanced synchronous dynamic random-access memory, SynchLink dynamic random-access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can, for example, be comprised in, or can comprise, SSC 110-510, SSC instance 410-411, etc., SPC 130-530, etc., server 170, 370, 372, 470, 471, 472, etc., UE 102, 302, 402, 502, etc., NDCC 160, 360, 460-461, 560, etc., CNC 204, etc., ping 462, 463, etc., or any other component of systems 100-500, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random-access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory, or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory, or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries, or other data retrieval protocols, for a variety of operations with respect to the information stored by the medium. As such, for example, a computer-readable medium can comprise executable instructions stored thereon that, in response to execution, can cause a system comprising a processor to perform operations comprising receiving network information that enables determining a topological distance between endpoint devices, e.g., servers, etc. The operations can further comprise determining a location of a user equipment and an intended-use service for the user equipment. The operations can further support providing access to a ranking of the endpoint device, wherein the ranking of the endpoint device is determined according to a first ranking rule related to the location of the user equipment, a second ranking rule related to the topological distance between the endpoint devices, and a third ranking rule related to the endpoint device hosting an instance of a service that is a same service as the intended-use service. In this regard, the access to the ranking of the endpoint device can enable selection of the endpoint device based on the ranking.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line-controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as requested or needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring, and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), fifth generation partnership project (5G or 5GPP); sixth generation partnership project (6G or 6GPP), next generation (NG) radio, LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); sixth generation partnership project (6G or 6GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer", or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices, and drawings such terms are intended to be inclusive in a manner similar to the term "comprising" as "comprising" is interpreted when employed as a transitional word in a claim.

What is claimed is:

1. A device, comprising:
   a processor; and
   a memory that stores executable instructions that, when executed by the processor, facilitate performance of operations, comprising:
   receiving network information comprising network topology information enabling determining a distance between endpoint devices;
   receiving user equipment information comprising a location of a user equipment;
   measuring a first latency between the user equipment and a first endpoint device of the endpoint devices resulting in a measured latency;
   determining that the measured latency between the user equipment and the first endpoint device does not correspond to a topological distance between the user equipment and the first endpoint device resulting in a determination;
   based on the determination, converting the measured latency to a constructive topological distance associated with the user equipment and the first endpoint device;
   adjusting the network topology information based on the measured latency resulting in adjusted network topology information, wherein the adjusting of the network topology information comprises replacing the topological distance between with the user equipment and the first endpoint device with the constructive topological distance associated with the user equipment and the first endpoint device;
   ranking the endpoint devices according to a ranking rule related to location of the user equipment and topological distance between the endpoint devices based on the adjusted network topology information;
   enabling access to ranks of the ranking to enable selection of a-second endpoint device of the endpoint devices based on the ranks; and
   selecting the second endpoint device based on the ranks and whether each of the endpoint devices include an instance of a service, wherein the selecting of the second endpoint device reduces latency in performing the service.

2. The device of claim 1, wherein the selection is performed by the device based on the ranks.

3. The device of claim 1, wherein the device comprises a service provider device.

4. The device of claim 3, wherein the selection of the second endpoint device results in a second latency between the second endpoint device and a third endpoint device of the endpoint devices.

5. The device of claim 4, wherein the second latency is a reduced latency in comparison to a third latency between a fourth endpoint device of the endpoint devices and the third endpoint device.

6. The device of claim 1, wherein the selection of the second endpoint device results in a first geographical distance between the second endpoint device and a fifth endpoint device of the endpoint devices, and wherein the first geographical distance is greater than a second geographic distance between a sixth endpoint device of the endpoint devices and the fifth endpoint device.

7. The device of claim 6, wherein a first topological distance between the second endpoint device and the fifth endpoint device is less than a second topological distance between the sixth endpoint device and the fifth endpoint device.

8. The device of claim 1, wherein the selection of the second endpoint device results in a second geographical distance between the second endpoint device and a seventh endpoint device of the endpoint devices, and wherein the second geographical distance is less than a third geographic distance between an eighth endpoint device of the endpoint devices and the seventh endpoint device.

9. The device of claim 8, wherein a third topological distance between the second endpoint device and seventh second endpoint device is less than a fourth topological distance between the eighth endpoint device and the seventh endpoint device.

10. The device of claim 1, wherein the second endpoint device hosts an instance of a service, wherein the user equipment information comprises an indication of an intended-use service, and wherein the intended-use service and the instance of the service correspond to a same service.

11. The device of claim 1, wherein the second endpoint device does not host an instance of a service, wherein the user equipment information comprises an indication of an intended-use service, wherein the selection of the second endpoint device corresponds to instantiating the instance of the service at the second endpoint device, and wherein the intended-use service and the instantiated instance of the service correspond to a same service.

12. The device of claim 11, wherein the instantiating of the instance of the service is determined to correspond to pricing data prior to the selection of the second endpoint device, and wherein the selection of the second endpoint device is further based on the pricing data.

13. The device of claim 1, wherein the operations further comprise receiving preferred endpoint information indicating preferred endpoint devices, and wherein ranking the endpoint devices is constrained to the preferred endpoint devices of the endpoint devices.

14. The device of claim 1, wherein the operations further comprise receiving preferred endpoint information indicating preferred endpoint devices, and wherein ranking the endpoint devices is not constrained to the preferred endpoint devices of the endpoint devices.

15. The device of claim 14, wherein a rank of the ranks of the second endpoint device is increased in response to determining that the second endpoint device is a preferred endpoint device of the preferred endpoint devices.

16. A method, comprising:
measuring, by a system comprising a processor, a first latency between user equipment a first endpoint device of endpoint devices resulting in a measured latency;
determining, by the system, that the measured latency between the user equipment and the first endpoint device does not correspond to a topological distance between the user equipment and the first endpoint device resulting in a determination;
based on the determination, converting, by the system, the measured latency to a constructive topological distance associated with the user equipment and the first endpoint device;
adjusting, by the system, network topology information corresponding to a network based on the measured latency resulting in adjusted network topology information, wherein the adjusting of the network topology information comprises replacing by the system, the topological distance between with the user equipment and the first endpoint device with the constructive topological distance associated with the user equipment and the first endpoint device;
determining, by a system, a topological distance between endpoint devices based on the adjusted network topology information;
determining, by the system, a location of the user equipment and an intended-use service for the user equipment;
facilitating, by the system, selection of a second endpoint device of the endpoint devices based on a rank of the second endpoint device, wherein the rank of the second endpoint device was determined according to a first ranking rule related to the location of the user equipment, a second ranking rule related to the topological distance between the endpoint devices, and a third ranking rule related to the second endpoint device hosting an instance of a service that is a same service as the intended-use service; and
selecting the second endpoint device based on the rank of the second endpoint device and whether each of the endpoint devices include an instance of a service, wherein the selecting of the second endpoint device reduces latency in performing the service.

17. The method of claim 16, wherein the selection of the second endpoint device results in a first geographical distance between the second endpoint device and a third endpoint device of the endpoint devices, wherein the first geographical distance is greater than a second geographic distance between a fourth endpoint device of the endpoint devices and the third endpoint device, wherein the topological distance is a first topological distance between the second endpoint device and the third endpoint device, and wherein the first topological distance is less than a second topological distance between the fourth endpoint device and the third endpoint device.

18. The method of claim 16, wherein the selection of the second endpoint device results in a first geographical distance between the second endpoint device and a fifth endpoint device of the endpoint devices, wherein the first geographical distance is less than a second geographic distance between a sixth endpoint device of the endpoint devices and the fifth endpoint device, wherein the topological distance is a third topological distance between the second endpoint device and the fifth endpoint device, and wherein the third topological distance is less than a fourth topological distance between the sixth endpoint device and the fifth endpoint device.

19. A non-transitory machine-readable medium, comprising executable instructions that, when executed by a processor, facilitate performance of operations, comprising:
measuring a first latency between user equipment and a first endpoint device of the endpoint devices resulting in a measured latency;
determining that the measured latency between the user equipment and the first endpoint device does not correspond to a topological distance between the user equipment and the first endpoint device resulting in a determination;

based on the determination, converting the measured latency to a constructive topological distance associated with the user equipment and the first endpoint device;

adjusting network topology information based on the measured latency resulting in adjusted network topology information, wherein the adjusting of the network topology information comprises replacing the topological distance between with the user equipment and the first endpoint device with the constructive topological distance associated with the user equipment and the first endpoint device;

based on the adjusted network topology information, enabling a determination of a topological distance between endpoint devices based on topology data representative of a topology of a corresponding network;

determining location data representative of a location of the user equipment and intended-use service data representative of an intended-use service for the user equipment;

providing access to ranking data representative of a ranking of a second endpoint device, wherein the ranking of the second endpoint device was determined according to a first ranking rule related to the location of the user equipment, a second ranking rule related to the topological distance between the endpoint devices, and a third ranking rule related to the second endpoint device hosting an instance of a service that is a same service as the intended-use service, and wherein the access to the ranking data enables selection of the second endpoint device based on the ranking; and selecting the second endpoint device based on the ranking and whether each of the endpoint devices include an instance of the service, wherein the selecting of the second endpoint device reduces latency in performing the service.

20. The non-transitory machine-readable medium of claim 19, wherein the second endpoint device is not executing an instance of a service that is a same service as the intended-use service, wherein the operations further comprise determining, prior to the selection of the first endpoint device, pricing information related to instantiating the instance of the service at the second endpoint device, wherein the selection of the second endpoint device is further based on the pricing information, and wherein the selection of the second endpoint device triggers instantiating the instance of the service at the second endpoint device.

* * * * *